(No Model.)

D. E. SIBLEY.
GRAIN SCOURING MACHINE.

No. 493,603. Patented Mar. 14, 1893.

Witnesses:
Ray Hutchins.
Herbert Cowell.

Inventor:
Dennis E. Sibley By
Thos H Hutchins his atty

UNITED STATES PATENT OFFICE.

DENNIS E. SIBLEY, OF CHICAGO, ILLINOIS, ASSIGNOR TO JAMES A. SIBLEY, OF SAME PLACE.

GRAIN-SCOURING MACHINE.

SPECIFICATION forming part of Letters Patent No. 493,603, dated March 14, 1893.

Application filed October 15, 1892. Serial No. 448,946. (No model.)

*To all whom it may concern:*

Be it known that I, DENNIS E. SIBLEY, a citizen of the United States of America, residing at Chicago, in the county of Cook and State of Illinois, have invented certain new and useful Improvements in Grain-Scouring Machines, of which the following is a specification, reference being had therein to the accompanying drawings and the letters of reference thereon, forming a part of this specification, in which—

Figure 1:
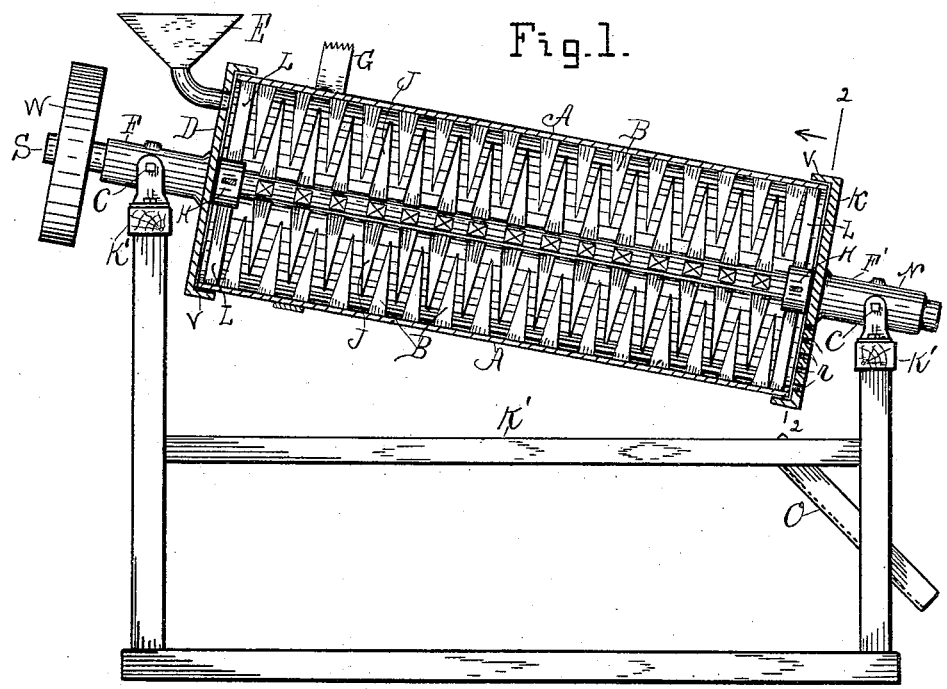
Figure 2:
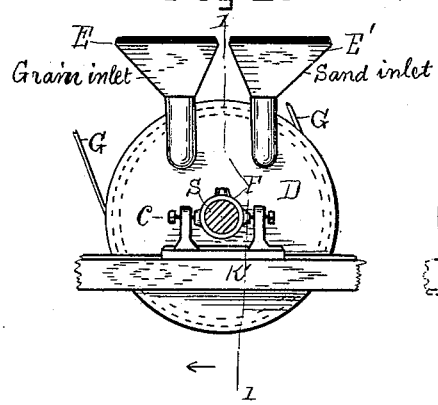
Figure 3:
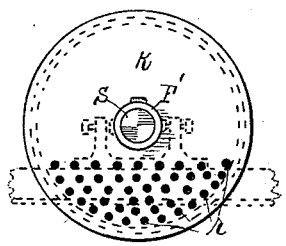
Figure 4:
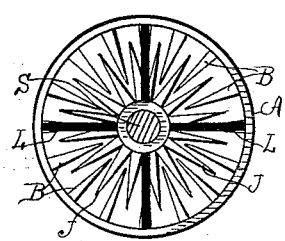

Figure 1 is a vertical section of the rotating cylinder of the machine and of the heads for closing its ends, and a side view of the shaft of said cylinder and of its boxes, said section being taken on line 1 of Fig. 2 looking in the direction of the arrow. Fig. 2, is a side view of one of the flanged cylinder heads showing the grain and sand inlet hoppers. Fig. 3, is a side view of one of the cylinder heads having discharge openings or perforations and Fig. 4, is an end view of the rotating cylinder, and a cross section of its shaft showing the stirring arms on said shaft, and on the inner side of said cylinder, and also showing a hub and arms or spokes for connecting said hub and cylinder, and journaled on said shaft, said view being taken on line 2 of Fig. 1 looking in the direction of the arrow.

This invention relates to certain improvements in grain scouring machines which improvements are fully set forth and explained in the following specification and claims.

Referring to the drawings A represents a cylinder open at each end, and journaled on the shaft S passing centrally and longitudinally through it, by means of the hubs H and the arms or spokes L connecting said hubs respectively with the inner wall of said cylinder at or near either end as shown in Fig. 1. The interior surface of said cylinder is provided with a series of stirring arms B all of which converge toward the center of the cylinder, but not so as to be in contact with said shaft.

D is a head having the integral box F in which shaft S is journaled at its upper end, said box being supported at either side between pivot points C so that the said box may permit said shaft to be inclined. Said head is provided with an inlet hopper E for admitting grain to said cylinder, and also a sand inlet hopper E' for admitting sand to said cylinder with the grain.

K is a flanged head for closing the opposite or lower end of said cylinder and is provided with a similar integral box F' in which the opposite or lower end of shaft S is journaled, and which box is similarly supported between two pivot points C as box F and for the same purpose. Said head K is provided with perforations r through which the grain and sand are discharged together to fall on a sieve O, to be separated. The shaft S is provided on its part within said cylinder with a series of radially extending stirring arms J arranged to alternate with the arms on the inner side of said cylinder, and is also provided with a pulley w on its outer end upon which a belt may be placed to drive said shaft. G represents a belt applied to said cylinder to drive it. The said shaft and its boxes are supported on a frame K'. It is intended to have said heads remain stationary and have their extending flanges v respectively extend over the ends of the cylinder A and in such manner that said heads and flanges will not be in contact with said cylinder, but form a close joint therewith so as to prevent as much as possible escape of material from between said heads and cylinder.

In operation a belt is intended to be applied to the pulley w of shaft S to drive said shaft at a rather high speed, and a belt G is applied to the cylinder A to drive it in the opposite direction from said shaft, and at a less speed. The cylinder and shaft are arranged so that the end at which grain and sand are admitted to the cylinder is on a higher plane than its opposite end so that the material in it will be carried, or work toward the lower end of the machine to the discharge openings in the head K. When the parts are in operation as stated grain is fed in at the hopper E, and sand at the hopper E', and while they are in the said cylinder, the action of the stirring arms B and J moving in opposite directions from each other and in the mixed grain and sand will cause the grain to be most thoroughly scoured by means of the action of the sand upon it, and as the machine inclines the action of the stirring arms causes the grain and sand to pass out finally through the discharge openings *r* in the head K and fall upon the sieve O, to separate the grain from the sand.

Any other means for separating the grain from the sand may be used, and any means may be used to drive the cylinder and shaft, and any other material than sand may be used to scour the grain.

The working parts are designed to be supported by a proper frame K', but may be supported by any other suitable means than that shown.

Having thus described my invention, what I claim as new, and desire to secure by Letters Patent, is as follows, to wit:

1. In a grain scouring machine the combination of a rotatable cylinder having open ends and having its inner walls provided with a series of stirring arms arranged to converge toward its longitudinal center, a rotatable shaft boxed within said cylinder and having a series of radial stirring arms arranged to alternate with the arms of said cylinder stationary heads for closing the ends of said cylinder but out of contact therewith and having respectively inlet and exit apertures, the said cylinder and shaft being adapted to rotate in opposite directions, all arranged to operate substantially as and for the purpose set forth.

2. In a grain scouring machine the combination of the open end cylinder A having the stirring arms B on its inner walls, shaft S having the radial stirring arms J, hubs H, arms L for connecting said hubs and cylinder, stationary head D having the inlet hoppers E and E', and having a flange *v*, and also having an integral box F, for receiving said shaft, head K having the discharge apertures *r*, and having an integral box F' for receiving said shaft and also having the flange *v*, and the means for driving said shaft and cylinder in opposite directions substantially as and for the purpose set forth.

DENNIS E. SIBLEY.

Witnesses:
THOS. H. HUTCHINS,
JAMES W. SIBLEY.